(12) United States Patent
Stewart et al.

(10) Patent No.: US 9,727,526 B2
(45) Date of Patent: Aug. 8, 2017

(54) APPARATUS AND METHOD OF VECTOR UNIT SHARING

(75) Inventors: Malcolm Stewart, Ottawa (CA); Ali Osman Ors, Ottawa (CA); Daniel Laroche, Kemptville (CA)

(73) Assignee: NXP USA, Inc., Austin, TX (US)

( * ) Notice: Subject to any disclaimer, the term of this patent is extended or adjusted under 35 U.S.C. 154(b) by 506 days.

(21) Appl. No.: 13/981,851

(22) PCT Filed: Jan. 25, 2011

(86) PCT No.: PCT/CA2011/000080
§ 371 (c)(1),
(2), (4) Date: Sep. 16, 2013

(87) PCT Pub. No.: WO2012/100316
PCT Pub. Date: Aug. 2, 2012

(65) Prior Publication Data
US 2014/0006748 A1    Jan. 2, 2014

(51) Int. Cl.
*G06F 15/76* (2006.01)
*G06F 15/80* (2006.01)
(Continued)

(52) U.S. Cl.
CPC .......... *G06F 15/76* (2013.01); *G06F 9/30036* (2013.01); *G06F 15/7867* (2013.01);
(Continued)

(58) Field of Classification Search
CPC .. G06F 9/30036; G06F 9/3867; G06F 9/3006; G06F 15/76; G06F 15/7867;
(Continued)

(56) References Cited

U.S. PATENT DOCUMENTS 4,633,389 A    12/1986 Tanaka et al.
4,760,525 A *   7/1988 Webb .................. 712/2
(Continued)

FOREIGN PATENT DOCUMENTS

EP    1011052 A2    6/2000
JP    H0520283 A    1/1993

OTHER PUBLICATIONS

Schwederski et al. "Computer Architecture Concepts and Systems—Chapter 5: Parallel Processing" New York, NY: Elsevier Science Ltd, 1987 S 178-184, 191-193, 196-198, 204-204, 214-224.
(Continued)

*Primary Examiner* — Daniel Pan

(57) ABSTRACT

A reconfigurable vector processor is described that allows the size of its vector units to be changed in order to process vectors of different sizes. The reconfigurable vector processor comprises a plurality of processor units. Each of the processor units comprises a control unit for decoding instructions and generating control signals, a scalar unit for processing instructions on scalar data, and a vector unit for processing instructions on vector data under control of control signals. The reconfigurable vector processor architecture also comprises a vector control selector for selectively providing control signals generated by one processor unit of the plurality of processor units to the vector unit of a different processor unit of the plurality of processor units.

19 Claims, 19 Drawing Sheets

(51) Int. Cl.
  *G06F 9/30* (2006.01)
  *G06F 15/78* (2006.01)
  *G06F 9/38* (2006.01)

(52) U.S. Cl.
  CPC ........ *G06F 9/30112* (2013.01); *G06F 9/3867* (2013.01); *G06F 9/3885* (2013.01); *G06F 9/3887* (2013.01); *G06F 15/8007* (2013.01); *G06F 15/8053* (2013.01); *G06F 15/8076* (2013.01); *G06F 15/8084* (2013.01); *G06F 15/8092* (2013.01)

(58) Field of Classification Search
  CPC ............. G06F 15/8092; G06F 15/8053; G06F 15/8084; G06F 15/8076; G06F 9/3885; G06F 9/3887; G06F 15/8007; G06F 9/30112; G06F 9/3016
  USPC .......................................... 712/1, 7, 4, 11, 22
  See application file for complete search history.

(56) References Cited

U.S. PATENT DOCUMENTS

| | | | |
|---|---|---|---|
| 4,771,380 A * | 9/1988 | Kris ................................ | 712/6 |
| 4,905,143 A * | 2/1990 | Takahashi et al. ............. | 712/11 |
| 5,010,477 A * | 4/1991 | Omoda ............... | G06F 15/8092 |
| | | | 712/4 |
| 5,430,884 A * | 7/1995 | Beard et al. ...................... | 712/3 |
| 5,475,656 A | 12/1995 | Sato et al. | |
| 5,513,366 A * | 4/1996 | Agarwal et al. ................ | 712/22 |
| 5,887,186 A * | 3/1999 | Nakanishi ........................ | 712/28 |
| 6,317,819 B1 * | 11/2001 | Morton ............................ | 712/22 |
| 6,986,023 B2 * | 1/2006 | Paver et al. ..................... | 712/34 |
| 7,334,110 B1 | 2/2008 | Faanes et al. | |
| 8,495,342 B2 | 7/2013 | Capps, Jr. et al. | |
| 2004/0243657 A1 * | 12/2004 | Goren et al. ................... | 708/607 |
| 2005/0240644 A1 * | 10/2005 | Van Berkel et al. .......... | 708/441 |
| 2005/0240729 A1 * | 10/2005 | Van Berkel ......... | G06F 9/30025 |
| | | | 711/118 |
| 2007/0250688 A1 | 10/2007 | Kyou | |
| 2009/0150648 A1 * | 6/2009 | Mejdrich ............ | G06F 9/30032 |
| | | | 712/4 |

OTHER PUBLICATIONS

Siegel et al. "An Overview of the PASM Parallel Processing System" PASM Parallel Processing Laboratory School of Electrical Engineering Purdue University, West Lafayette, IN 47907 USA May 1986 S 387-407.

Nutt, Gary J., "Microprocesssor Implementation of a Parallel Processor" Department of Computer Science, University of Colorado, Boulder Colorado 50309 Jul. 1976, 20 pages.

Nishikawa et al., "Central Processing Unit and Main Memory Unit of SX-5 Series," NEC Technical Journal, vol. 52, Issue 11, Published Nov. 25, 1999, pp. 13-18.

* cited by examiner

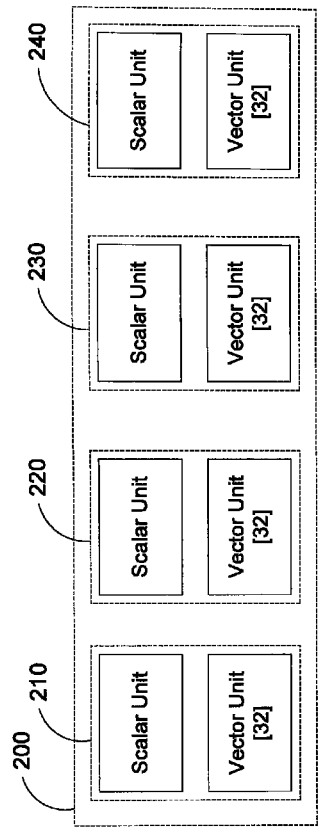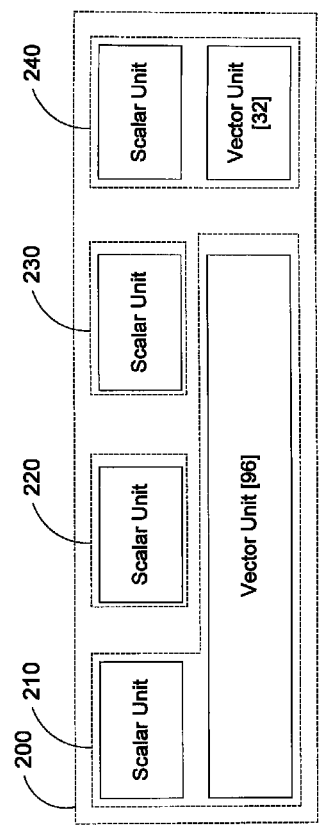
Figure 3A
Figure 3B

| Processing Unit 0 | Processing Unit 1 | Processing Unit 2 | Processing Unit 3 |
|---|---|---|---|
| 32 | 32 | 32 | 32 |
| 64 | | 32 | 32 |
| 32 | 64 | | 32 |
| 32 | 32 | 64 | |
| | 32 | 32 | 64 |
| 64 | | 64 | |
| | 64 | | 64 |
| 96 | | | 32 |
| 32 | 96 | | |
| | 32 | 96 | |
| | | 32 | 96 |
| 128 | | | |
| 128 | | | |
| 128 | | | |
| 128 | | | |

Figure 12A

| Processing Unit 0 | Processing Unit 1 | Processing Unit 2 | Processing Unit 3 |
|---|---|---|---|
| 32 | 32 | 32 | 32 |
| 64 || 32 | 32 |
| 32 | 32 | 64 ||
| 64 || 64 ||
| 96 ||| 32 |
| 32 || 32 | 96 ||
| 128 ||||
| 128 ||||

Figure 12B

| Processing Unit 0 | Processing Unit 1 | Processing Unit 2 | Processing Unit 3 |
|---|---|---|---|
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |
| 32 | 32 | 32 | 32 |

Figure 14

APPARATUS AND METHOD OF VECTOR UNIT SHARING

TECHNICAL FIELD

The present disclosure relates to image or data processing and in particular to a processor providing reconfigurable vector data processing units.

BACKGROUND

The processing of images may be computationally complex and in some applications benefit from dedicated processor or processing techniques. In order to process image information in real-time, or near real-time, various processing techniques may be used, in the design and implementation of image application specific processors. For example certain processors may include a scalar processing unit as well as one or more vector processing units that can execute an instruction on multiple pieces of information at once. The use of a vector processing unit can provide improved processing efficiencies particularly when the vector processing capability is matched to the processing task provided.

Although the use of a vector unit may provide improved efficiencies, previous vector units have been of a fixed processing width in terms of computational units (CUs) associated with each vector unit. Unless the task associated with the vector unit was of equal width, or vise versa, inefficient processor utilization or poor execution performance can result.

There is therefore a need for an improved vector unit sharing in processors.

SUMMARY

In accordance with an aspect of the present disclosure there is provided a reconfigurable vector processor comprising: a plurality of processor units, each comprising: a control unit for decoding instructions and generating control signals; a scalar unit for processing instructions on scalar data; and a vector unit for processing instructions on vector data based on the generated control signals; and a vector control selector for selectively providing control signals generated by one of the plurality of processor units to a vector unit associated with a different processor unit of the plurality of processor units.

In accordance with an aspect of the present disclosure there is provided a method of processing data using a reconfigurable vector processor comprising two or more processing units, each with a vector unit, the method comprising: configuring the reconfigurable vector processor to provide a vector unit of a first size for processing vector data of the first size; executing one or more instructions using the vector unit of the first size to process vector data of the first size; reconfiguring the reconfigurable vector processor to change the size of the vector unit to a second size; and executing one or more instructions using the vector unit of the second size to process vector data of the second size.

BRIEF DESCRIPTION OF THE DRAWINGS

Further features and advantages will become apparent from the following detailed description, taken in combination with the appended drawings, in which:

FIG. 3A depicts in a block diagram an arrangement of available scalar and vector units;
FIG. 3B depicts in a block diagram a further arrangement of available scalar and vector units;
FIG. 12A depicts possible vector sizes that processing units may control if each processing unit is capable of controlling the vector units of the other processing units;
FIG. 12B depicts possible vector sizes that processing units may control if only processing units 0 and 2 are capable of controlling the vector units of the other processing units;
FIG. 14 depicts a subset of the 24 possible vector unit control configurations for the reconfigurable vector processor of FIG. 13.

DETAILED DESCRIPTION

Embodiments of an apparatus, system and method of vector unit sharing are described by way of example only, with reference to the FIGS. 1 to 17.

A reconfigurable vector processor s described that allows the size of its vector units to be changed in order to process vectors of different sizes. The reconfigurable vector processors comprise a plurality of processor units. Each of the processor units comprises a control unit for decoding instructions and generating control signals; a scalar unit for processing instructions on scalar data; and a vector unit for processing instructions on vector data under control of control signals. The reconfigurable vector processor also comprises a vector control selector for selectively providing control signals generated by one processor unit of the plurality of processor units to the vector unit of a different processor unit of the plurality of processor units. Although the term processor is used in the present disclosure, a processor may be integrated into a processor comprising one or more cores or provided as an independent stand alone processor, or divided functionally between multiple physical processors to implement the functions of the vector processor. Alternatively, the vector processor may define a processor architecture utilized to implement the described functional characteristics in a number of physical implementations.

Figure 1A:
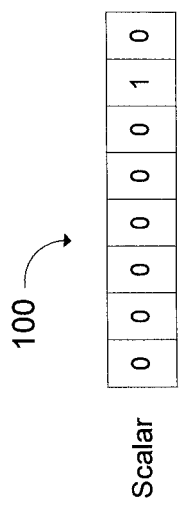
FIG. 1A depicts in a block diagram a scalar.

FIG. 1A depicts in a block diagram a scalar 100. The scalar 100 may be used to represent various data that can be processed. For example the scalar 100 may be a number used to represent the intensity of a color in a portion of an image. The scalar 100 comprises a plurality of bits. The scalar 100 is depicted as having a width of 8 bits, however it will be appreciated that scalars of other widths are possible depending on the architecture of the processor used. For example, a scalar may be 4 bits, 8 bits (typically referred to as a byte), 16 bits, 32 bits, 64 bits, etc. . . .

Figure 1B:
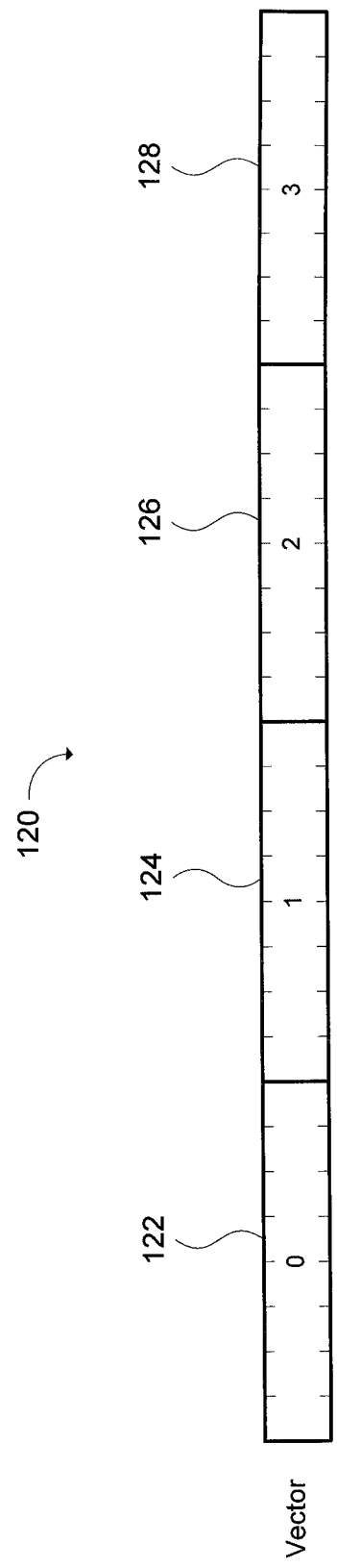
FIG. 1B depicts in a block diagram a vector.

FIG. 1B depicts in a block diagram a vector 120. The vector 120 comprises a plurality of scalar datum 122, 124, 126, 128. Typically each scalar 122, 124, 126, 128 of the vector 120 has the same width, for example 8 bits. The vector 110 is depicted having vector size of four, comprising the scalars 122, 124, 126, 128. It will be appreciated that vectors may be of differing sizes. For example a vector may be comprised of one or more scalars numbered from 0 to "size( )-1". The width of the scalars that comprise the vector may also vary. For example, a first vector may be comprised of 4 scalars, each 8 bits wide; a second vector may be comprises of 2 scalars, each 16 bits wide; and a third vector may be comprised of 1 scalar that is 32 bits wide.

The total width of the vector is determined based on the sum of the width of the scalars of the vector. A vector unit capable of processing the vector must be designed to process the number of scalars of the particular widths. For example, a vector unit that would be capable of processing the vector 120 would need to be able to process 4 scalars, each 8 bits wide. Previous vector units have been of a fixed total width, for example, a fixed total width of 64 bits. As such, it would be capable of processing a vector of a single 64 bit scalar or a vector of two 32 bit scalars, etc. However, with the previous vector processing unit, if not all of the bits, of the total width, were required, for example it is only required to process a vector of two 8 bit scalars, the additional processing capabilities of the vector processing unit was unusable.

Figure 2:
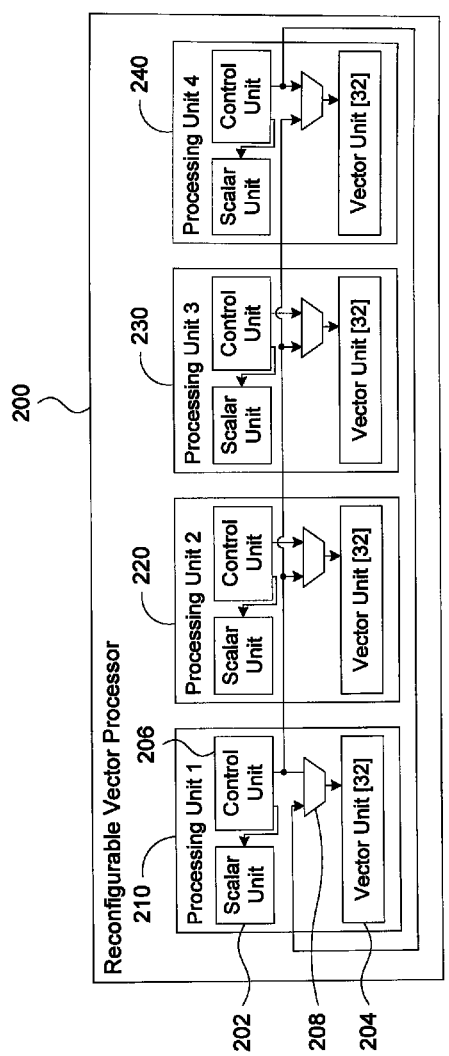
FIG. 2 depicts in a block diagram a reconfigurable vector processor.

FIG. 2 depicts in a block diagram a reconfigurable vector processor 200. The vector processor 200 comprises a plurality of processing units 210, 220, 230, 240. Each processing unit comprises a scalar unit 202, a vector unit 204, a control unit 206 and a vector control multiplexer 208.

The scalar unit 202 is capable of processing instructions on scalar data. For example, the scalar unit 202 may add two scalar numbers together. The scalar unit 202 has a fixed width that is the maximum width of a scalar that it can process. For example, a scalar unit may be 8 bits wide, 16 bits wide, 32 bits wide, 64 bits wide, although other widths are possible. The width of the scalar unit 202 refers to the maximum width of a scalar that it can process. In order to process one or more scalars, the processing unit decodes an instruction to be executed, such as add A to B, and controls the scalar unit through appropriate control signals in order to execute the desired instruction.

The vector unit 204 is capable of processing instructions on vector data. The vector units 204 depicted in FIG. 2 are shown as having a size of 32 CUs. For clarity of the description, each vector unit is described as being able to process a vector of 32 CUs each capable of processing 16 bit scalars, although it will be appreciated that each vector unit may be able to process different arrangements of vectors, such as eight 64 bit scalars Each vector unit 204 is capable of processing a vector with a maximum total vector width of 512 bits. In order to process one or more vectors, one of the processing units decodes an instruction to be executed, such as add the scalars of vector A to the scalars of vector B, and controls the vector unit through appropriate control signals in order to execute the desired instruction.

The control unit 206 receives one or more inputs, such as instructions to execute, decode them and provide them to the scalar unit 202, and vector unit 204 as appropriate.

The processing units 210, 220, 230, 240 are depicted as each comprising a vector control multiplexer 208. For clarity of the description, the vector control multiplexer 208 of each processing unit 210, 220, 230, 240 is depicted as multiplexing two control inputs to a single control input expected by the respective vector units 204. Each vector control multiplexer receives control signals from the control unit of the respective processing unit, which may be referred to as the internal control unit for clarity. The vector control multiplexers 208 may also receive control signals from one or more control units of other processing units, which may be referred to as an external control unit for clarity. Each vector control multiplexer 208 depicted in FIG. 2 receives two control signals, one from the internal control unit and one from an external control unit. In FIG. 2, the vector control multiplexer 208 of processing units 220, 230 and 240 each receive control signals from the external control unit of processing unit 210. The vector control multiplexer of processing unit 210 receives control signals from the external control unit of processing unit 240.

By appropriately controlling the vector control multiplexer 208 of each processing unit, the vector size that can be processed by a vector unit can be increased. Advantageously, this allows the processing capabilities to be adjustable as required. For example, the vector control multiplexer of processing units 220, 230 and 240 may be controlled so that they each provide the control signals from the external control unit of processing unit 210 to the respective vector units. This provides a vector unit that can process a larger sized vector, namely 128 CUs. If the maximum vector size is not required, individual vector units may be returned to the control of the respective internal control units. As such the processing efficiency may be increased. Additionally, while a vector unit is under the control of an external control unit, the processing unit may still operate as a scalar unit. Alternatively the control unit can operate both the scalar and vector unit(s) concurrently.

FIG. 3A depicts in a block diagram an arrangement of available scalar and vector units. FIG. 3A depicts a possible arrangement of four processing units. As depicted, the vector unit of each processing unit is under control of the respective internal control units. Each processing unit provides a scalar unit and a vector unit for processing a vector of size 32, so four separate scalars, or four separate vectors, each of size 32, or a combination thereof may be processed simultaneous. A processing unit typically operates the scalar unit and vector unit individually. However, depending on the specific design of the control unit, both the vector unit and the scalar unit could be run concurrently. Furthermore, if the vector unit is being operated under the control of a control unit of a different processing unit, it is possible to control the scalar unit using the control unit. Furthermore, a control unit may operate the scalar unit as well as control one or more other vector units at the same time.

FIG. 3B depicts in a block diagram a further arrangement of available scalar and vector units. FIG. 3B also depicts a possible arrangement of four processing units. In the arrangement of FIG. 3B, the vector units of processing units 220 and 230 have been taken over and are under the external control of the control unit of processing unit 210. As a result, four scalar units are available for processing. Only two vector units are available for processing; however, one of the processing units has a maximum vector size of 96 by combining the CU of the associated vector unit, while the second vector unit has a maximum vector size of 32.

As is apparent from the FIGS. 3A and 3B, the maximum vector size may be changed. This change may be based on various factors, such as the desired power usage, how time critical the processing is, the complexity of the processing, the size of the data to be processed, additional processing that is required to be performed, etc. Regardless of the reason for adjusting the size of the available vector units, it will be appreciated that the vector unit size can be adjusted, while allowing processing units that have had their respective vector units taken over to still provide the processing capabilities of the scalar unit.

The reconfigurable vector processor 200, in FIG. 2, described above was described as having four substantially identical processing units 210, 220, 230, 240. As described further below, it is possible to provide a reconfigurable vector processor with different configurations of processing units.

Figure 4:
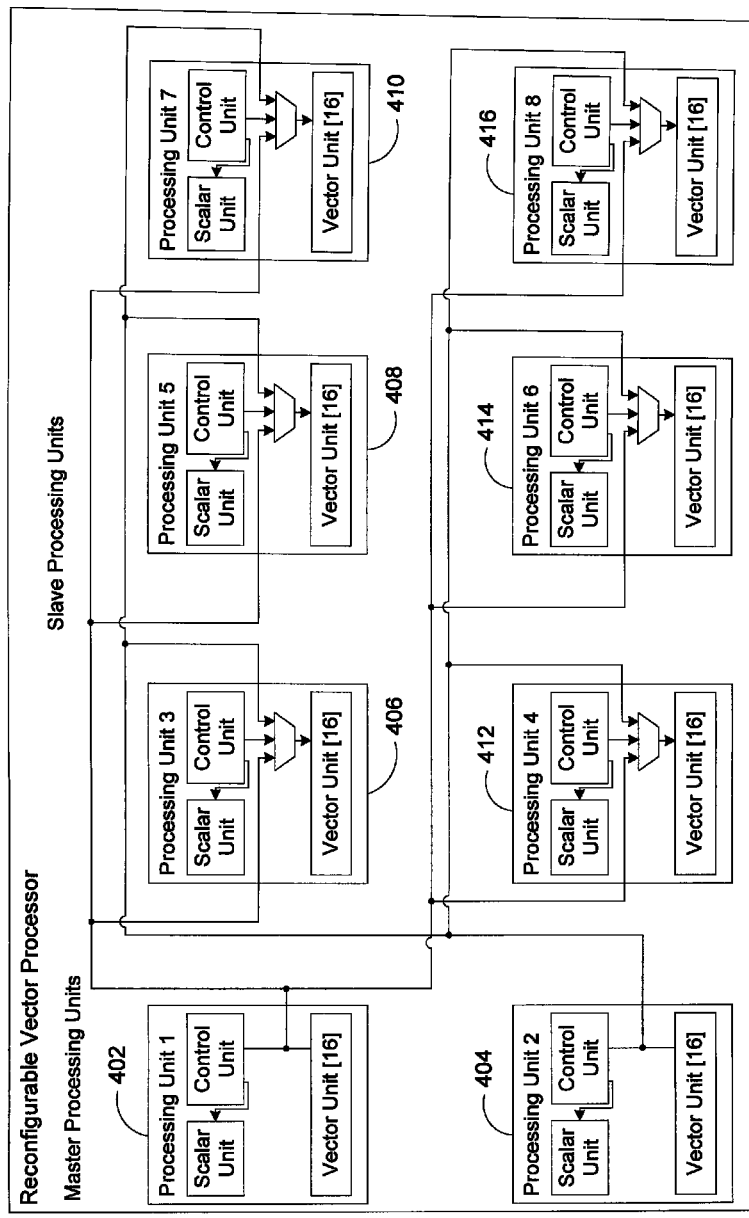
FIG. 4 depicts in a block diagram a reconfigurable vector processor.

FIG. 4 depicts in a block diagram a reconfigurable vector processor 400. The reconfigurable vector processor 400 is similar to the reconfigurable vector processor 200 in that the vector size of available vector units may be changed. However, unlike the reconfigurable vector processor 200, the reconfigurable vector processor 400 utilizes different processing units. As depicted, the reconfigurable vector processor 400 includes two master processing units 402, 404 and six slave processing units 406, 408, 410, 412, 414, 416. The two master processing units 402, 404 are similar to the processing units 210, 220, 230, 240; however the two master processing units have no vector control multiplexer. As such, the vector unit of each master processing unit 402, 404 will always be under the control of the respective internal control units.

Each of the slave processing units 406, 408, 410, 412, 414, 416 are similar to the processing units 210, 220, 230, 240 in that each processing unit includes a vector control multiplexer, which allows the vector units of the slave processing units to be controlled by one of the control units of the master processing units. As depicted, each vector control multiplexer includes three inputs of control signals. The control signals are from the internal control unit of each slave processing unit and the external control units from each master processing unit 402, 404. Under the appropriate control, the control vector multiplexer provides the desired control signals to the respective vector units, which allow the size of the vectors that can be processed to be changed.

The vector units of both the master and slave processing units are depicted in FIG. 4 as being of size 16 CUs.

It should be noted that the reconfigurable vector processor 200, FIG. 2, can be operated so that only a single vector unit, of size 128 (four times 32), is available (in addition to the scalar units). However, the reconfigurable vector processor 400, FIG. 4, will always have a minimum of two vector units since the vector units of each master processor 402, 404 are always under the control of the respective internal control unit.

Figure 5A:
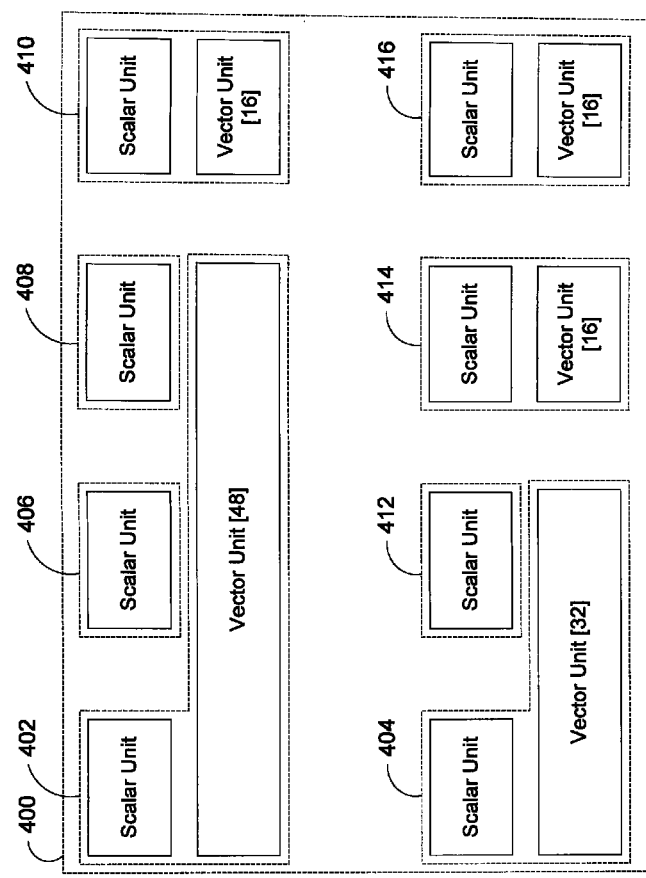
FIG. 5A depicts in a block diagram an arrangement of available scalar and vector units of eight processing units.

FIG. 5A depicts in a block diagram an arrangement of available scalar and vector units of eight processing units, comprising two master processing units and six slave processing units. As depicted in FIG. 5A, master processing unit 402 has taken over control of the vector units of two slave processing units 406 and 408. As such, master processing unit 402 can provide a vector unit with a size of 48. Master processing unit 404 has taken over control of the vector unit of one slave processing unit 412. As such, master processing unit 404 can provide a vector unit with a size of 32. The remaining slave processing units 408, 410 414, 416 may operate as either a vector unit of size 16 or a scalar unit, or both, depending on the respective control units. The internal control units of each slave processing unit 406, 408, 412 which have their vector units under external control, are capable of operating the processing units as scalar units.

Figure 5B:
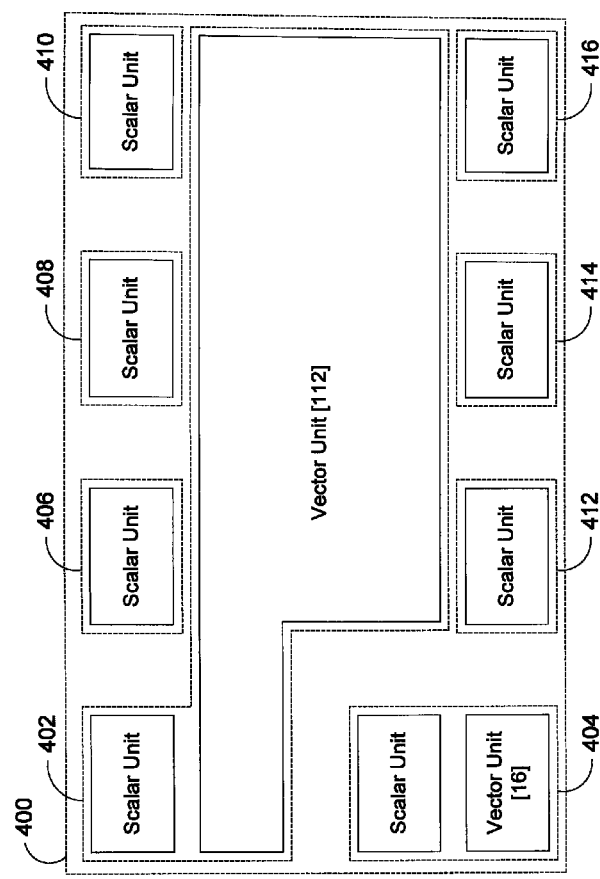
FIG. 5B depicts in a block diagram a further arrangement of available scalar and vector units of eight processing units.

FIG. 5B depicts in a block diagram a further arrangement of available scalar and vector units of eight processing units, comprising two master processing units and six slave processing units. As depicted in FIG. 5B, master processing unit 402 has taken over control of the vector units of all of the slave processing units 406, 408, 410, 412, 414, 416. As such, master processing unit 402 can provide a vector unit with a size of 112. Master processing unit 404 has not taken over control of the vector units of any slave processing units. As such, master processing unit 404 can provide a vector unit with a size of 16. The internal control units of each slave processing unit 406, 408, 410, 412, 414, 416, which have their vector units under external control, are capable of operating the processing units as scalar units.

The above has described various reconfigurable vector processors that comprise a plurality of processing units each with a vector control multiplexer. Depending on the instructions implemented by the vector units, it may be desirable, or necessary, to include additional multiplexers.

Figure 6:
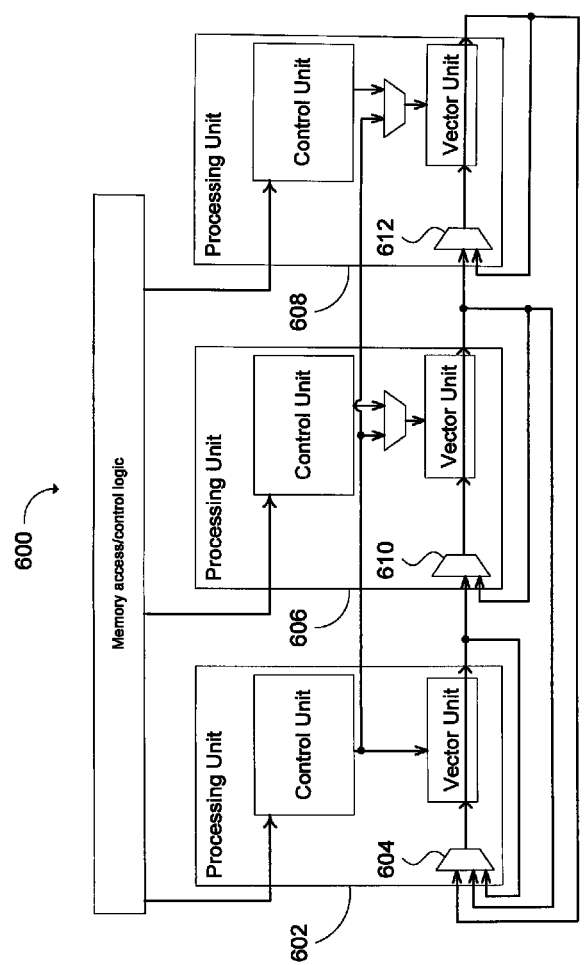
FIG. 6 depicts in a block diagram a further embodiment of a reconfigurable vector processor.

FIG. 6 depicts in a block diagram a further embodiment of a reconfigurable vector processor. The reconfigurable processor 600 may be used depending on the type of instructions that the vector units can perform. For example, it may be suitable if the vector units are capable of performing a shift right instruction, which causes the individual elements, or scalars, of the vector to shift one position to the right. The last element may be shifted to the first element. The scalar units of the processing units have been omitted from FIG. 6 for clarity of the description. The reconfigurable vector processor 600 comprises a master processing unit 602 and two slave processing units 606, 608. Each slave processing unit 606, 608 includes a vector control multiplexer for selecting the appropriate control unit that is controlling the vector unit, as previously described.

The processing units 602, 606, 608 each include a respective first data multiplexer 604, 610, 612. The master processing unit 602 includes the first input data multiplexer 604. The inputs of the first data multiplexer are the outputs from each of the vector units that the master processing unit 602 can control. In the embodiment of FIG. 6, this includes the outputs from the vector units of both slave processing units 606, 608 as well as the vector unit of the master processing unit 602 itself.

The slave processing units 606, 608 also include first data multiplexers 610, 612. However the inputs to the first data multiplexers 610, 612 are either the output from the vector unit of the respective slave processing units, or the output from the vector unit of a previous processing unit in a chain of combined vector units. It should be noted that the inputs of the first data multiplexers of the slave processing units determine what slave processing units can be combined together and provide the full instruction set, for example including the shift right instruction which may require the first data multiplexer.

With reference to FIG. 6, if a shift right function requires the first data multiplexers, the master processing unit can not control the vector unit of only slave processing unit 608, since it would require as input the output from the vector unit of the master processing unit, which is not available as input to the first data multiplexer. The master processing unit 602 could control the vector unit of slave processing unit 606, which does include an input to the first data multiplexer 610 from the vector unit of the master processing unit. The master processing unit 602 could also control the vector units of both slave processing units 606, 608 since an input of the first data multiplexer of the slave processing unit 606 is the output of the master processing units 602 vector unit and an input of the first data multiplexer of the slave processing unit 608 is the output from the vector unit of the previous processing unit in the combined vector, namely slave processing unit 606. As a result of the chain of vector units created with the first data multiplexers 604, 610, 612 it is possible to implement instructions which require shifting the elements of a vector, while maintaining the flexibility of being able to change the vector unit size. It will be appreciated that the flexibility of which processing units can be independently controlled by different processing units is determined based on the inputs to the first data multiplexers of each of the processing units. So for example, if the first data multiplexer 612 included an input from the output of the master processing unit's vector unit, then the master processor could control the vector unit and the associated computational units of the slave processing unit 608 independent of whether or not slave processing unit 606 is also under control of the master processing unit 602.

Figure 7:
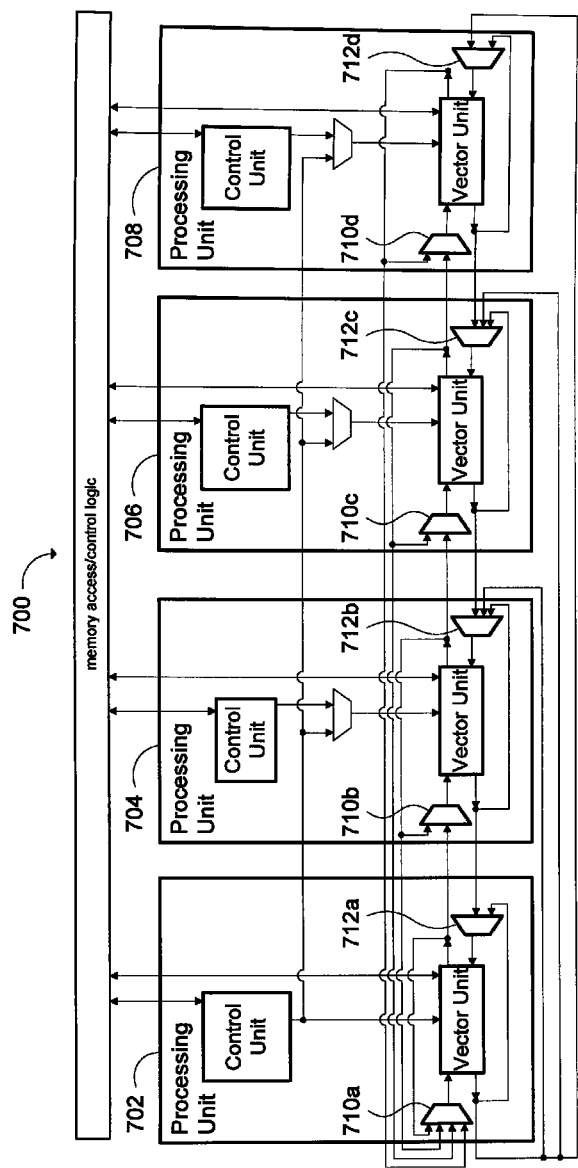
FIG. 7 depicts in a block diagram a further embodiment of a reconfigurable vector processor.

FIG. 7 depicts in a block diagram a further embodiment of a reconfigurable vector processor. The reconfigurable processor 700 may be used depending on the type of instructions that the vector units can perform. For example, it may be suitable if the vector units are capable of performing both a shift left and a shift right instruction. In order to perform both a shift left and shift right a vector unit needs to be able to replace the last element in a vector with the first element in a vector, or vice versa. This is represented schematically in FIG. 7 through the use of a pair of multiplexers—one for each direction.

The reconfigurable vector processor 700 comprises four processing units 702, 704, 706, 708. Processing unit 702 acts as a master processing unit and may take control of the vector units of one or more of the processing units 704, 706, 708, which act as slave processing units. Each of the processing units 702, 704, 706, 708 comprise a first data multiplexer 710a, 710b, 710c, 710d (referred to as 710 collectively) and a second data multiplexer 712a, 712b, 712c, 712d (referred to as 712 collectively). Both the first and second data multiplexers receive as input the output from vectors units of the processing units. The first and second data multiplexers 710, 712 allow a chain of vector units to be created that can shift elements between the vector units to the left and to the right. As with the first data multiplexers 604, 610, 612 of reconfigurable vector unit 600, FIG. 6, the inputs to the various first and second data multiplexers 710, 712 determine which vector units can be controlled by the master processing unit 702 independent of what other vector units are being controlled. For example, if the vector unit of slave processing unit 708 is to be controlled by the control unit of the master processing unit 702, it must also control the vector units of the other slave processing units 704, 706 so that the vector units can be connected together in a chain using the first and second data multiplexers 710, 712.

Figure 8:
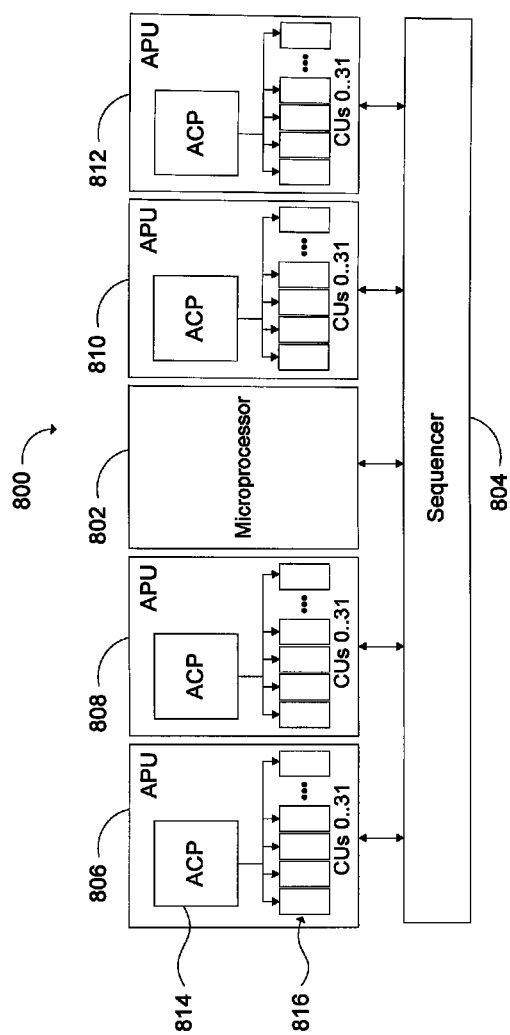
FIG. 8 depicts in a block diagram a system in which a reconfigurable vector processor may be used.

FIG. 8 depicts in a block diagram a system in which a reconfigurable vector processor may be used. The system 800 comprises a microprocessor 802 that can execute instructions that are stored in memory (not shown). The processor 802 may be for example an ARM™ processor, although other processors or microprocessors may be used. The system further includes a sequencer 804 that receives instructions for the reconfigurable vector processor to execute. The sequencer 804 provides the appropriate control signals to the various array processing units (APU) 806, 808, 810, 812 in order to execute the instructions in the proper sequence/order. Each of the APUs 806, 808, 810, 812 is similar in functionality to the processing units described above with respect to reconfigurable vector processors 200, 400, 600, 700. Each APU comprises an array control processor (ACP) 814 processor as well as the control unit that decodes the instructions and provides appropriate control signals to the computational units (CUs) 816. Each group of CUs 816 of the APUs 806, 808, 810, 812 act as a vector unit as described above. Each APU is depicted as having 32 CUs, which provides a vector unit having a size of 32. Each group of CUs can be combined together and controlled by a single control unit provided an ACP, and so provide processing of vectors of different sizes, for example 32, 64, 96 and 128.

The processor 802 can provide instructions to the sequencer 804 to be executed by the APUs 806, 808, 810, 812. For example, the processor 802 may provide instructions to the sequencer 804 to execute four different instructions on four different respective vectors, each of size 32. Alternatively, the processor 802 may provide instructions to execute an instruction on a single vector of size 128, and three different instructions on three different scalars.

As described above, the system 800 can reconfigure the vector size that can be processed in order to provide an efficient distribution of processing resources. When APUs are reconfigured to allow their respective CUs to be controlled by a different APU, the scalar unit provided by the ACPs may still be used to provide processing of one or more scalars.

Figure 9:
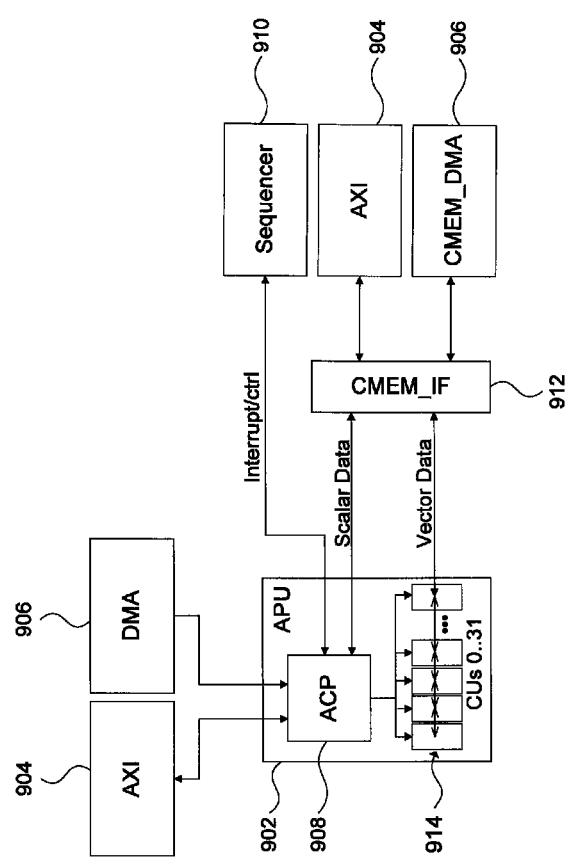
FIG. 9 depicts in a block diagram an APU with connections to various components of a system using a reconfigurable vector processor.

FIG. 9 depicts in a block diagram an APU with connections to various components of a system using a reconfigurable vector processor. The APU 902 may be used as one of the APUs 806, 808, 810, 812 of system 800. The APU 902 is connected to an advanced extensible interface (AXI) bus 904 that allows the APU to transfer data to and from other components of a system that are connected to the AXI bus 904. Although described as an AXI bus, any other type of bus or connection that allows the APU to transfer data to and from other components may be used. The APU may also be connected to a DMA interface 906 for providing direct memory access for loading data into the vector data memory (CMEM). Both the AXI 904 and DMA 906 may load data into the memories space of the APU (1004, 1006 in FIG. 10, 1118 in FIG. 11). The APU 902, or more particularly the ACP 908 of the APU 902, may also be coupled to a sequencer 910, such as sequencer 804 of the system 800, that provides interrupt and/or control signals to the APU 902.

In addition to the AXI 904 and DMA 906 connections described above, the APU 902 may also be connected to the AXI and CMEM_DMA connections through an interface (CMEM_IF) 912 for loading data into and out of the APU 902. The CMEM_IF 912 can vectorize data and provide the vectorized data to the CUs 914 of the APU 902. The CMEM_IF 912 may also provide scalar data to the APU. The CMEM_IF 912 may also provide the vector data and scalar data from the APU 902 to the AXI 904 or the CMEM_DMA 906. CMEM_IF 912 may be used to load new data into the APU, or memory (CMEM) associated with the APU, and pull out old, or processed, data while the APU is processing current data.

Figure 10:
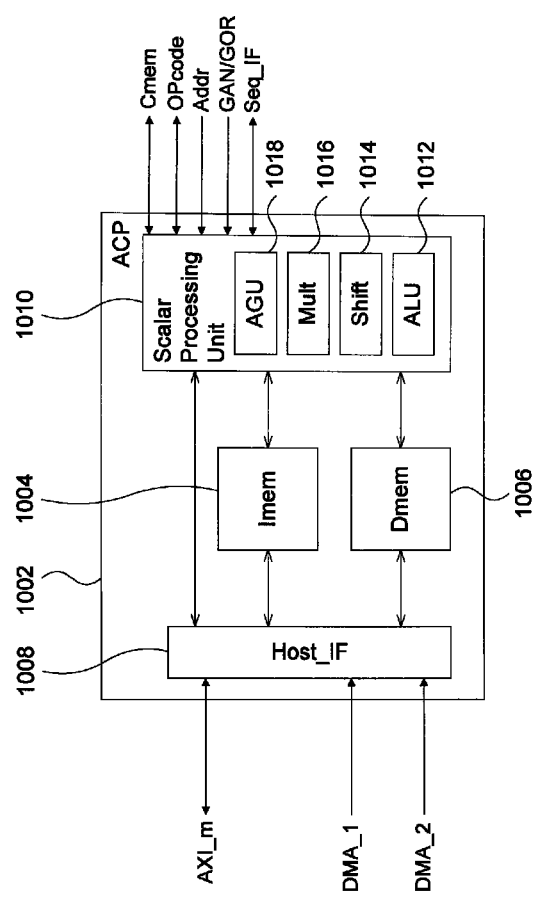
FIG. 10 depicts in a block diagram components of an ACP.

FIG. 10 depicts in a block diagram components of an ACP. The ACP 1002 may be used as the ACPs 806, 808, 810, 812 of FIG. 8 or 908 of FIG. 9. The ACP 1002 includes memory for instructions (Imem) 1004 and memory for data (Dmem) 1006. The Imem 1004 and Dmem 1006 can receive data, either instructions or data to be processed, from a host interface (Host_IF) 1008. The host interface 1006 may be connected to an AXI bus and one or more DMA channels. The ACP 1002 may also include a scalar processing unit 1010. The scalar processing unit 1010 receives one or more instructions or control signals, such as an OPcode, a memory address, signals from the sequencer or a global and/global or signal. The scalar processing unit may also be connected to Cmem in order to receive and/or provide data. The scalar processing unit 1010 can decode the instructions and control signals and provide control signals to other components, for example to one or more vector units.

In addition to decoding instructions and providing control signals to one or more vector units, the scalar processing unit 1010 also includes components for processing scalars. The scalar processing components may include for example an arithmetic logic unit (ALU) 1012 for performing arithmetic functions such as addition on one or more scalars. The scalar processing unit 1010 may also include a shifting component 1014 for shifting bits of a scalar to the left or to the right, a multiplying component 1016 for multiplying scalars together as well as an address generation unit (AGU) component 1018 for generating the address of the next instruction to be executed.

Figure 11:
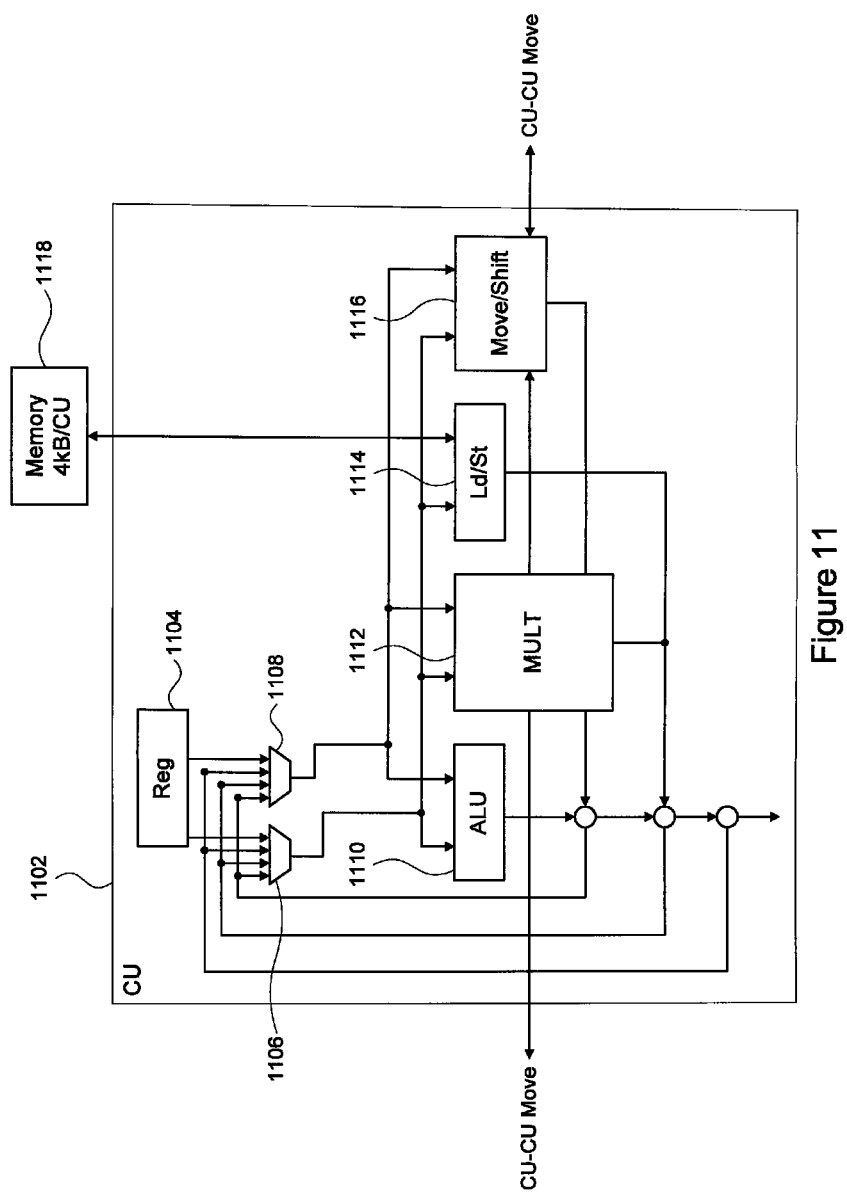
FIG. 11 depicts in a block diagram components of a CU.

FIG. 11 depicts in a block diagram components of a CU. The CU 1102 may be used as the CUs 816, 914. The CU 1102 includes a register 1104 and two bypass multiplexers 1106, 1108. As is understood, the bypass multiplexers allow data from different stages in the processing pipeline to be used as inputs to the processor functional units 1110, 1112, 1114, and 1116.

The CU includes various components for executing instructions, including an ALU unit 1110 for performing arithmetic functions on elements of one or more vectors, a multiplication component 1112 for multiplying elements of vectors, a load/store unit 1114 coupled to a memory 1118 for loading or storing data. The CU 1102 also includes a move/shift component 1116. The move/shift component 1116 moves or shifts data between CUs. The move/shift component 1116 is connected to the move/shift component of other CUs. If vector units of different processing units are coupled together to form a single processing unit, the move/shift units of the last CUs of the vector units may be coupled to the move/shift units of the first CUs of the vector units through one or more data multiplexers.

Although not depicted in FIG. 11, it is possible to provide reconfigurable connections between CUs. For example, a vector unit may be 128×16 bits. The CUs connections between the CUs could be reconfigured to provide, for example 64×32 bits, or 256×8 bits. Reconfigurable vector units, as well as systems that can utilize a reconfigurable vector unit, have been described. The reconfigurable vector units and systems described above may be used in various applications that require processing of data. For example, the reconfigurable vector units and systems may be used to process audio data, video data or both audio and video data.

The above description has described various embodiments of reconfigurable vector units, other variations are possible. For example, a reconfigurable vector unit may be comprises of a plurality of processing units, each one capable of controlling the vector units of the other processing units.

FIG. 12A depicts possible vector sizes that each of the processing units may control if each processing unit is capable of controlling the vector units of the other processing units as described above. As depicted each of the four processing units may control a vector unit of size 32, 64, 96 or 128. The shading of each block representing a vector unit depicts which of the processing units controls the processing units controls the respective vector unit.

The programming flexibility may be reduced by allowing only a subset of the processing units to control vector units of other processing units.

FIG. 12B depicts the possible vector sizes that each of the processing units may control if only processing units 0 and 2 are capable of controlling the vector units of the other processing units as described above. The shading of each block representing a vector unit depicts which of the processing units controls the processing units controls the respective vector unit.

Figure 13:
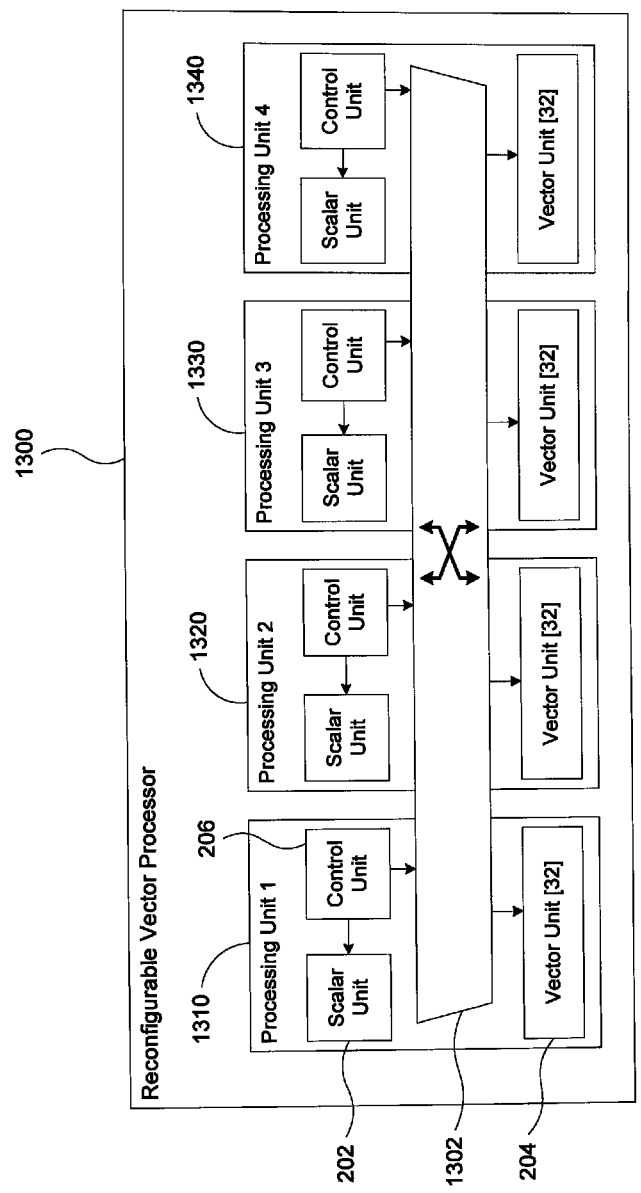
FIG. 13 depicts in a block diagram a reconfigurable vector processor with a crossbar switch.

FIG. 13 depicts in a block diagram a reconfigurable vector processor 1300. The vector processor 1300 comprises a plurality of processing units 1310, 1320, 1330, 1340. Each processing unit is similar to the processing units 210, 220, 230, 240 described above and each comprise a scalar unit 202, a vector unit 204, and a control unit 206. However instead of a vector control multiplexer 208, the reconfigurable vector processor comprises a crossbar switch 1302.

The crossbar switch 1302 allows any control unit of a processing unit to control any vector unit of another processing unit. One possible advantage to this arrangement is that it is possible to pipeline control of a vector unit allocation thru different processing units without needing to move any data.

FIG. 14 depicts a subset of the 24 possible vector unit control configurations for vector units of size 32. Although FIG. 14 only depicts control of vector units of size 32, it will be appreciated that the crossbar switch may also be used when controlling different vector units of varying sizes as described above. Processing units may control different size vector units, such as 64, 96 or 128. In order to reduce routing space in the data path of the crossbar switch 1302, vector units that can be grouped together and controlled by a single processing unit may be arranged adjacent to one another.

Figure 15:
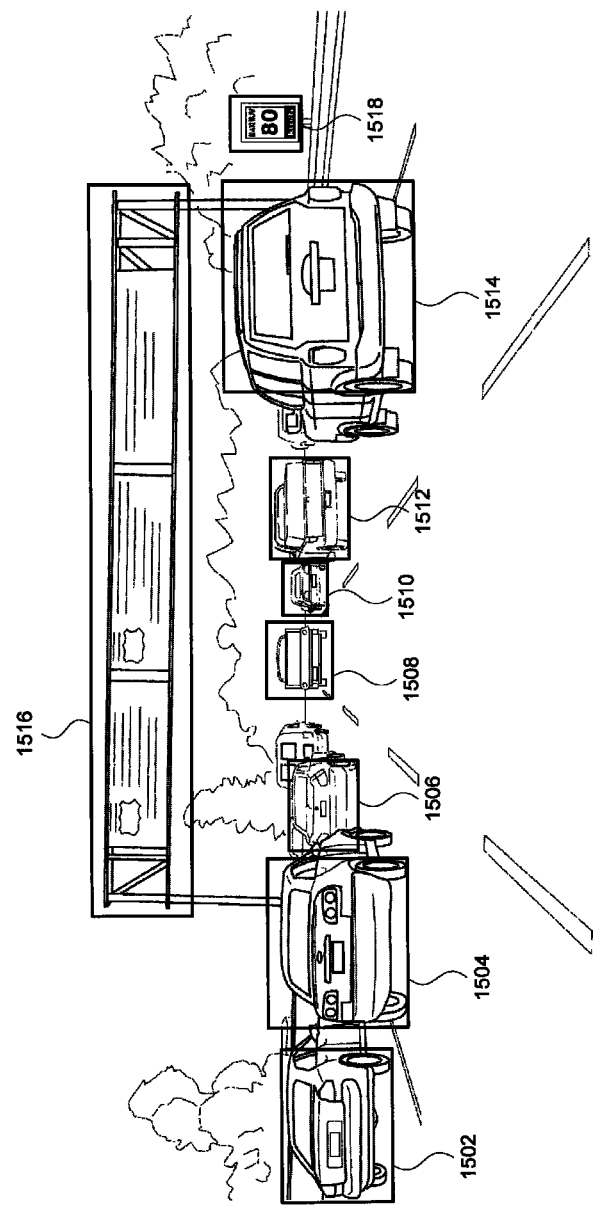
FIG. 15 depicts an illustrative image that may be processed using the reconfigurable vector processor and systems.

FIG. 15 depicts an illustrative image that may be processed using the reconfigurable vector processor and systems described above. The application described with reference to FIG. 15 may provide real-time processing of frames of a video captured by a video camera on an automobile. The frames of the video may be processed in order to search for and identify elements in the frame image. For example, the frame images may be processed to identify cars, road signs, as well as to perform additional functionality such as detecting objects in a car's blind spot, or dewarping the frame image.

The entire image may be first processed in order to search for candidate elements in the image. The candidate elements may comprise, for example automobiles in the image. The process identifies one or more candidate elements as depicted by boxes 1502, 1504, 1506, 1508, 1510, 1512, 1514 of FIG. 15. The candidate elements may include objects such as for example road signs 1516, 1518, although road signs may be detected through a separate process. Since processing the entire image requires processing the most amount of data, the reconfigurable vector processor used to process the image data may be configured to provide the largest possible vector size when performing the candidate search or processing function on the image data. When the reconfigurable vector unit is configured to provide the largest vector size, three scalar units are available to be used. These scalar units may be used when performing the candidate search in order to provide additional functionality. This additional functionality can include, for example dewarping of images to correct for fish-eye lenses that may have been used to capture the images or detecting objects in a car's blind spot.

Once an image has been processed to identify candidate elements, the individual candidate elements, for example the individual blocks 1502, 1504, 1506, 1508, 1510, 1512, 1514, 1516, 1518 depicted in FIG. 15, may be processed to verify and classify the individual candidate elements. Since the size of each individual candidate element will be smaller than the entire image, it is not necessary to use the maximum available vector size. As such the, reconfigurable vector processor can be configured to provide two vector units of equal size. Each vector unit can be used for different functions. For example one of the vector units may be used to verify and classify the individual elements, while the second vector unit may be used to search a portion of the frame image for road signs or to further process identified signs.

As described above, a system having a reconfigurable vector processor allows multiple algorithms to be executed by the system. Advantageously, the reconfigurable vector processor allows the system to be configured to provide efficient processing based on the requirements of the algorithm being processed.

Figure 16:
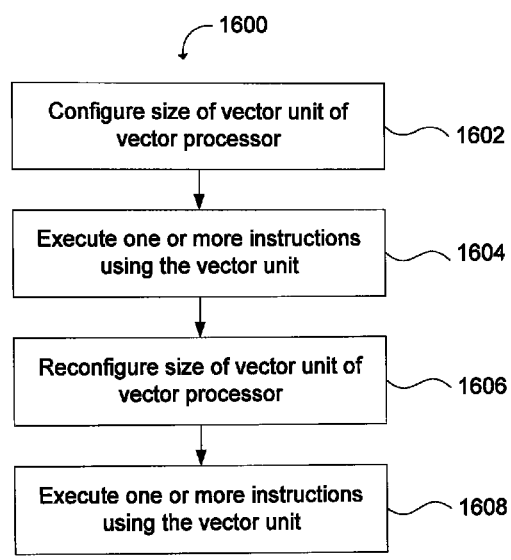
FIG. 16 depicts in a flow chart a method of processing data with a reconfigurable vector processor.

FIG. 16 depicts in a flow chart a method of processing data with a reconfigurable vector processor. The method 1600 first configures a size of a vector unit of a vector processor (1602) by allocating CUs associated with one or more of a plurality of respective other (slave or external) processing units. The size of the vector unit may be configured by controlling the plurality of vector units with a single control (master or internal) processing unit. One or more instructions are executed using the vector unit of the configured size (1604). The slave processing units can be controlled by the master unit or be utilized to process instructions requiring smaller vector units, or provide scalar processing functionality only as required. The size of the vector unit may then be reconfigured to provide a different size vector unit (1606). The CUs allocated to the vector unit of the master processing unit may be increased or decreased in size as required by the particular processing task. Once the size of the vector unit is reconfigured one or more instructions are executed using the vector unit of the reconfigured size. Using the above described method it is possible to modify the vector size capable of being processed by a vector unit.

Figure 17:
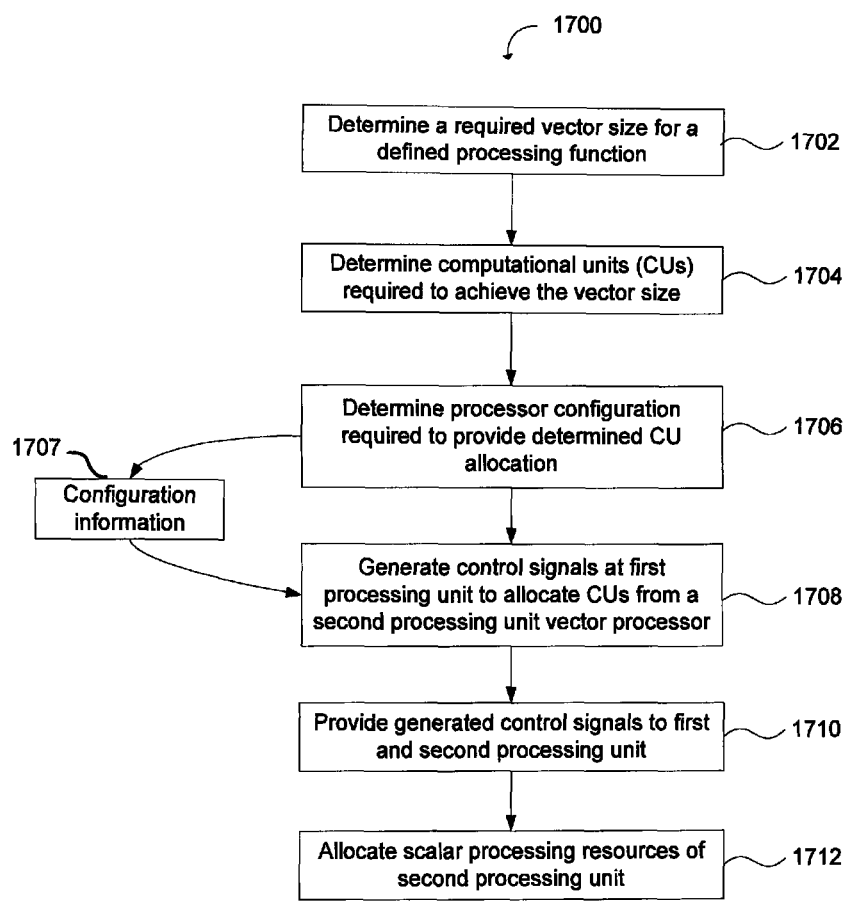
FIG. 17 depicts in a flow chart a method of configuring a size of a vector unit.

FIG. 17 depicts in a flow chart a method of configuring a size of a vector unit of a reconfigurable vector processor. A required vector size is determined for a required processing function to be performed by the reconfigurable vector processor (1702). If multiple processing functions are required concurrently, the vector size for each function is determined and optimized to the capability of the processor and the number of processing units available. This may be dynamically performed by a control microprocessor during operation or startup of the reconfigurable vector processor or based upon predefined processing requirements determined at programming or compile time of the code required for operation of the reconfigurable vector processor. The number of computational units (CUs) required to achieve the vector size (1704) is determined based upon the available configurations of processing units and the associated vector units. One or more processor configurations are determined that is required to provide determined CU allocation (1706) based upon one or more of the processing functions. The configuration determines which processor(s) will act as master or controlling processor, or slave processor, and which vector units are reallocated. Control signals are generated for controlling the vector unit of a first processing unit (1708). The control signals may be dynamically determined by a control processor, or may be generated based upon configuration information (1707) generated at coding or compile time based upon predetermined allocation metrics defining processing requirements associated with instructions or algorithms to be performed by the vector processor. The generated control signals are provided to a vector unit of the first processing unit as well as a vector unit of a second processing unit (1710). By providing the generated control signals to both vector units, the size of the vector unit controlled by the first processing unit is increased. The size of the vector unit may be configured or reconfigured by providing the appropriate generated control signals to different components of the reconfigurable vector processor such as vector control multiplexer, data multiplexers or switches. The control signals to the second processing unit may allocate the scalar processing resources of the second processing unit (1712) to execute processing functions without a vector unit by using scalar functionality of the second processing unit or utilize the second processing unit as a slave processing function to the master processing unit. In addition to executing instructions using the vector unit of the first or second size, the method may also execute instructions using one or more scalar processors, or one or more additional vector units.

Certain adaptations and modifications of the described embodiments can be made. Therefore, the above discussed embodiments are considered to be illustrative and not restrictive.

What is claimed is:

1. A reconfigurable vector processor comprising:
    a plurality of processor units, each comprising:
        a scalar unit for processing instructions on scalar data;
        a vector unit for processing instructions on vector data; and
        a control unit for decoding instructions and generating control signals to control the scalar unit and the vector unit;
    a vector control selector for selectively providing control signals generated by one of the control units of one of the plurality of processing units to a vector unit associated with a different processor unit of another one of the plurality of processor units to enable the vector unit associated with the different processor unit to be re-associated to and controlled by the one of the control units,
    wherein the vector control selector comprises a vector control multiplexer associated with a first processor unit of the plurality of processor units for selectively coupling the vector unit of the first processor unit to the control unit of the first processor unit or to a control unit of a second processor unit of the plurality of processor units to selectively provide the one or more control signals generated by the first processor unit or the second processor unit to the vector unit of the first processor unit.

2. The reconfigurable vector processor of claim 1, wherein the vector control selector comprises a crossbar switch for receiving a plurality of respective control signals from one or more of the plurality of processor units and selectively providing one or more of the received plurality of respective control signals to the respective vector units of one or more processor units of the plurality of processor units.

3. The reconfigurable vector processor architecture of claim 1, further comprising a vector data connector for selectively coupling a data path of the vector unit of one of the plurality of processing units to a data path of the vector unit of the different processing unit of the plurality of processing units providing the control signals by the vector control selector.

4. The reconfigurable vector processor of claim 1, further comprising a plurality of vector control selectors, each vector control selector comprising a vector control multiplexer associated with a respective vector unit of each of the plurality of processor units.

5. The reconfigurable vector processor of claim 4, wherein the respective control units of one or more processor units are coupled to the vector control multiplexer associated with a different processor unit.

6. The reconfigurable vector processor of claim 5, wherein the one or more of the processor units comprise a vector control multiplexer for selectively coupling the vector unit to the control unit of another processor unit.

7. The reconfigurable vector processor of claim 1, wherein the scalar unit of each of the plurality of processor units can perform arithmetic, logical and shift operations.

8. The reconfigurable vector processor of claim 1 wherein each of the plurality of processor units further comprises an address generation unit component for generating the address of a next instruction to be executed by the processor unit.

9. The reconfigurable vector processor of claim 1, wherein the scalar processor unit of each of the plurality of the processor units can operate concurrently with their respective vector units.

10. The reconfigurable vector processor of claim 1, wherein the scalar unit of each of the processor units can operate autonomously from their respective vector units.

11. The reconfigurable vector processor of claim 1, wherein one or more of the plurality of processor units each further comprise one or more data multiplexers for selectively coupling the vector units of the one or more processor units together.

12. The reconfigurable vector processor of claim 1, wherein each vector unit comprises a plurality of computational units (CUs) each for processing data of a defined bit length.

13. The reconfigurable vector processor of claim 12, wherein each CU is configured to perform add and shift operations on received data.

14. The reconfigurable vector processor of claim 12, wherein each CU comprises:
a data register;
a plurality of bypass multiplexers coupled to the data register;
an arithmetic logic unit coupled to outputs of the plurality of bypass multiplexers;
a multiplication unit coupled to the outputs of the plurality of bypass multiplexers;
a load/store unit coupled to the outputs of the plurality of bypass multiplexers and a memory; and
a move/shift unit coupled to the outputs of the plurality of bypass multiplexers and one or more other computation units.

15. A method of processing data using a reconfigurable vector processor, the method comprising:
configuring one of a plurality of processing units of the processor to provide a vector array of a first size for processing data of the first size, the vector array provided by selectively associating vector units associated with different processing units of the plurality of processing units with the one of the plurality of processing units;
executing one or more instructions using the vector array of the first size to process data of the first size;
reconfiguring one of the plurality of processing units of the processor to change the vector array to a second size to process data of the second size by selectively re-associating vector units associated with different processing units of the plurality of processing units to the one or the plurality of processing units;
executing one or more instructions using the vector unit of the second size to process vector data of the second size;
selectively providing control signals generated by a control unit of one of the plurality of processing units to a vector unit associated with a different processor unit of another one of the plurality of processor units to enable the vector unit associated with the different processor unit to be re-associated to and controlled by the one of the control units.

16. The method of claim 15, wherein configuring and reconfiguring the size of the vector processing unit comprises:
generating control signals for controlling a vector unit of a first processing unit of the plurality of processing units; and
providing the generated control signals to the vector unit of the first processing unit and a vector unit of a second processing unit to provide a vector array with a total size of a sum of individual vector units of the first and second processing units.

17. The method of claim 15, wherein configuring one of a plurality of processing units of the processor comprises:
providing appropriate control signals to one or more components of the reconfigurable vector processor comprising a vector control multiplexer, or data multiplexers.

18. The method of claim 15, further comprising:
executing instructions using one or more scalar processors of the reconfigurable vector processor when executing instructions using the vector unit associated with the different processor unit.

19. The method of claim 15, further comprising:
configuring the reconfigurable vector processor to provide one or more additional vector units for processing vector data.

* * * * *